(12) United States Patent
Kieffer et al.

(10) Patent No.: US 9,670,919 B2
(45) Date of Patent: Jun. 6, 2017

(54) PLURAL COMPONENT PUMPING SYSTEM

(75) Inventors: Joseph W. Kieffer, Chanhassen, MN (US); Jeffrey Scott Jerdee, Brooklyn Park, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 25 days.

(21) Appl. No.: 13/285,449

(22) Filed: Oct. 31, 2011

(65) Prior Publication Data

US 2012/0282121 A1 Nov. 8, 2012

Related U.S. Application Data

(60) Provisional application No. 61/415,252, filed on Nov. 18, 2010.

(51) Int. Cl.
| | |
|---|---|
| *F04B 23/06* | (2006.01) |
| *F04B 23/02* | (2006.01) |
| *F04B 49/06* | (2006.01) |
| *F04B 49/20* | (2006.01) |
| *F04B 17/03* | (2006.01) |

(Continued)

(52) U.S. Cl.
CPC .......... *F04B 23/06* (2013.01); *B01F 15/042* (2013.01); *F04B 17/03* (2013.01); *F04B 23/02* (2013.01); *F04B 49/065* (2013.01); *F04B 49/20* (2013.01); *G05D 11/005* (2013.01)

(58) Field of Classification Search
CPC .......... F04B 23/02; F04B 23/04; F04B 49/02; F04B 49/06; F04B 2203/02; F04B 2203/0209; F04B 2201/1201; G05D 11/005; B01F 15/042
USPC ................... 417/426, 2, 3, 286, 293, 53, 63
See application file for complete search history.

(56) References Cited

U.S. PATENT DOCUMENTS 3,317,141 A * 5/1967 Mann ............................ 239/127
3,775,025 A * 11/1973 Maher et al. ..................... 417/7
4,019,653 A    4/1977 Scherer et al.

(Continued)

OTHER PUBLICATIONS

International Search Report and Written Opinion for PCT Application No. PCT/US2011/058699, dated Feb. 16, 2012, 11 pages.

(Continued)

*Primary Examiner* — Bryan Lettman
*Assistant Examiner* — Timothy Solak
(74) *Attorney, Agent, or Firm* — Katherine M. Scholz; Kelly, Holt & Christenson, PLLC (57) ABSTRACT

A plural component pump system is provided for delivering plural liquid components at a selected ratio. The pump system includes a first brushless DC motor configured to drive a first pump that pumps a first liquid component to an output and a second brushless DC motor configured to drive a second pump that pumps a second liquid component to the output. The pump system includes a first controller configured to control the first motor and a second controller configured to control the second motor. The pump system also includes a communication interface between the first controller and the second controller. The first controller is configured to send a signal to the second controller using the communication interface and the second controller is configured to control the second motor based on the signal to deliver the first and second liquid components to the output at the selected ratio.

14 Claims, 6 Drawing Sheets

(51) Int. Cl.
*G05D 11/00* (2006.01)
*B01F 15/04* (2006.01)

(56) References Cited

U.S. PATENT DOCUMENTS

| | | | | |
|---|---|---|---|---|
| 4,090,695 A | * | 5/1978 | Stone | B29B 7/7626 222/63 |
| 4,341,327 A | * | 7/1982 | Zeitz | B67D 7/08 222/135 |
| 4,509,903 A | | 4/1985 | Fram | |
| 4,789,100 A | * | 12/1988 | Senf | 239/61 |
| 4,846,118 A | * | 7/1989 | Slattery | F01M 3/00 123/73 AD |
| 4,998,672 A | | 3/1991 | Bordaz et al. | |
| 5,005,765 A | | 4/1991 | Kistner | |
| 5,388,761 A | * | 2/1995 | Langeman | 239/1 |
| 5,558,409 A | * | 9/1996 | Walenty | B60T 7/042 303/10 |
| 5,772,899 A | * | 6/1998 | Snodgrass et al. | 210/767 |
| 5,810,254 A | * | 9/1998 | Kropfield | 239/61 |
| 5,857,589 A | | 1/1999 | Cline et al. | |
| 5,892,307 A | * | 4/1999 | Pavlovich et al. | 310/68 B |
| 5,992,686 A | * | 11/1999 | Cline | B05B 12/1418 222/1 |
| 6,126,039 A | | 10/2000 | Cline et al. | |
| 6,161,723 A | | 12/2000 | Cline et al. | |
| 6,286,566 B1 | | 9/2001 | Cline et al. | |
| 6,314,996 B1 | * | 11/2001 | Borglum et al. | 137/565.29 |
| 6,383,572 B1 | * | 5/2002 | De Graaf et al. | 427/427.2 |
| 6,529,135 B1 | * | 3/2003 | Bowers | H02P 23/0077 318/806 |
| 6,913,166 B2 | | 7/2005 | Cline et al. | |
| 2003/0015547 A1 | * | 1/2003 | Pittman | B01F 13/1055 222/63 |
| 2003/0223876 A1 | * | 12/2003 | Anderson et al. | 417/12 |
| 2005/0103889 A1 | * | 5/2005 | Langeman | 239/303 |
| 2006/0071022 A1 | * | 4/2006 | McCormick | G05D 11/005 222/135 |
| 2006/0144447 A1 | * | 7/2006 | Pittman | B01F 15/00155 137/565.29 |
| 2008/0021989 A1 | * | 1/2008 | Carraher et al. | 709/223 |
| 2008/0144427 A1 | | 6/2008 | Phallen | |
| 2008/0221465 A1 | * | 9/2008 | Steffens | A61B 5/026 600/504 |
| 2008/0221495 A1 | * | 9/2008 | Steffens et al. | 604/4.01 |

OTHER PUBLICATIONS

Excel "Plural Component Systems, Intro to Plural Component Systems," Aug. 2005.
Second Chinese Office Action for Chinese Patent No. 201180055492.9 dated Aug. 19, 2015, 9 pages with English Translation.
Third Office Action for Chinese Patent Application No. 201180055492.9 dated Feb. 29, 2016, 19 pages.
First Office Action for Counterpart Chinese Patent Application No. 2080055492.9, issuing date: Dec. 9, 2014, 19 pages.
Fourth Office Action for Chinese Patent Application No. 201180055492.9 dated Jul. 19, 2016, 15 pages.

* cited by examiner

PLURAL COMPONENT PUMPING SYSTEM

The present application is based on and claims the benefit of U.S. provisional patent application Ser. No. 61/415,252, filed Nov. 18, 2010, the content of which is hereby incorporated by reference in its entirety.

The present disclosure generally relates to plural component systems and more specifically, but not by limitation, to a plural component pump system having an interface between pump units for delivering plural liquid components at a desired ratio.

BACKGROUND

Plural component systems provide a number of different liquid materials that are combined or mixed at a particular ratio to generate a composition that is delivered for coating a surface, for example. Some plural component applications include, but are not limited to, building construction and various applications within automotive, agricultural, marine, and industrial environments. More specifically, some particular applications include, but are not limited to, spraying foam insulation and spraying protective coatings on pipes and tanks, structural steel, and marine vessels, to name a few.

SUMMARY

A plural component pump system is provided for delivering plural liquid components at a selected ratio. In one example, the pump system includes a first brushless DC motor configured to drive a first pump that pumps a first liquid component to an output and a second brushless DC motor configured to drive a second pump that pumps a second liquid component to the output. The pump system includes a first controller configured to control the first brushless DC motor and a second controller configured to control the second brushless DC motor. The pump system also includes a communication interface between the first controller and the second controller. The first controller is configured to send a signal to the second controller using the communication interface and the second controller is configured to control the second brushless DC motor based on the signal to deliver the first and second liquid components to the output at the selected ratio.

In one exemplary embodiment, a method of operating first and second pump units to deliver plural components at a particular ratio is provided. The method includes operating the first and second pump units in a first mode in which the first and second pump units are independent of each other and operating the first and second pump units in a second mode in which operation of the second pump unit is based on the first pump unit.

In one exemplary embodiment, a plural component pump system for delivering plural liquid components at a desired ratio is provided. The pump system includes a first container for a first liquid component, a second container for a second liquid component, a first pump unit, and a second pump unit. The first pump unit includes a first inlet tube disposed at least partially within the first container and configured to receive the first liquid component and a first outlet. The second pump unit includes a second inlet tube disposed at least partially within the second container and configured to receive the second liquid component and a second outlet. The second pump unit is communicatively coupled to the first pump unit and controlled based on a signal received from the first pump unit to deliver the first and second liquid components from the outlets at the desired ratio.

DETAILED DESCRIPTION OF ILLUSTRATIVE EMBODIMENTS

The present disclosure generally relates to plural component systems for delivering two or more liquid components that are combined, for instance using an output component or applicator such as, but not limited to, a spray gun or extruding gun. By way of example, in the case of a spray gun the liquid components are combined (e.g., externally or internally using an internal mixing chamber) and sprayed onto a surface. While various embodiments are illustratively described herein in the context of a spray gun, it is understood that other types of output components or applicators can be utilized.

In many instances, plural component coatings can deliver benefits over single component coatings in particular applications, such as improved durability, better chemical resistance, increased flexibility, etc. Typically, when two or more components are combined in a plural component system a reaction is created between the components which can be both time and temperature dependent. Maintaining accurate ratios of the plural components is very important.

Figure 1:
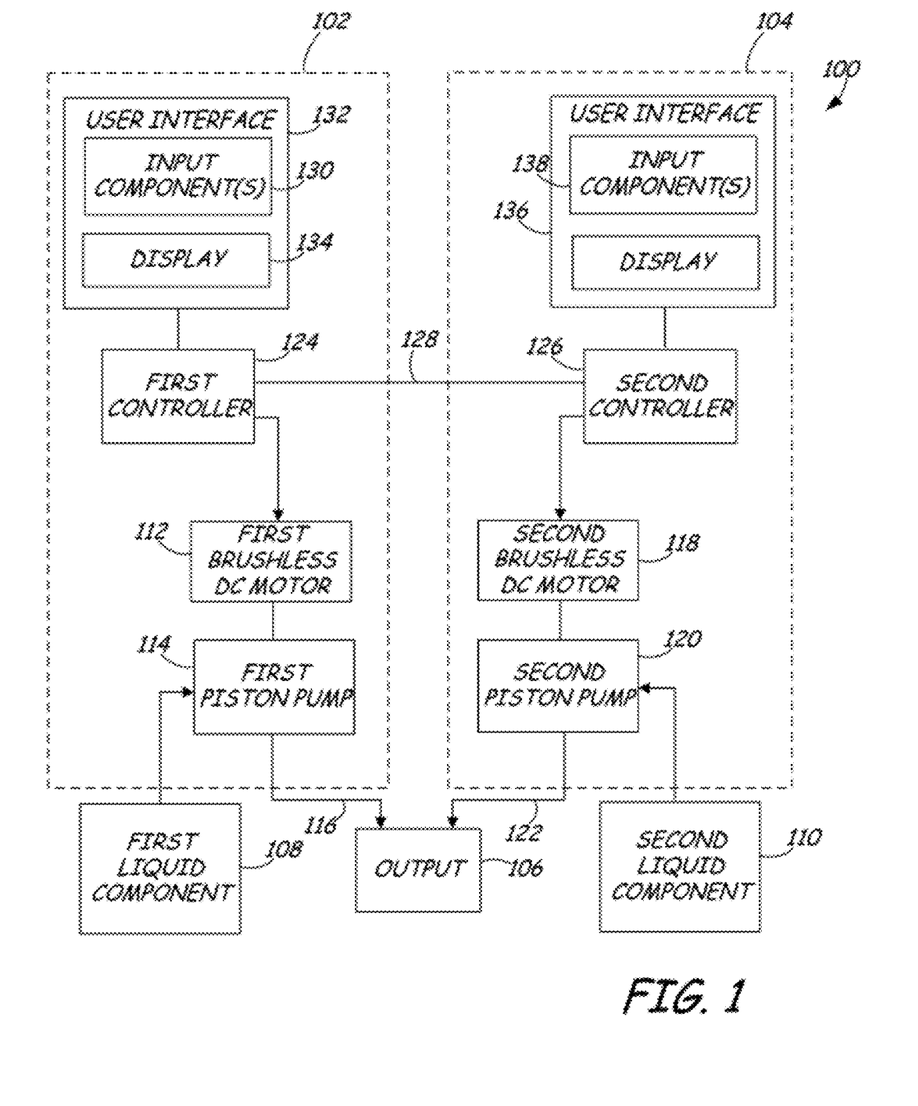
FIG. 1 is a schematic illustration of a plural component pump system, under one embodiment.

FIG. 1 illustrates one embodiment of a plural component pump system 100 that includes at least a first pump unit 102 and a second pump unit 104 each configured to deliver a respective component to an output 106, such as a spray gun. Pump system 100 illustratively comprises an airless system. In one embodiment, pump system 100 can comprise an air-driven or air-assisted system. It is also noted that while two pump units are illustrated, in one embodiment three or more pump units can be utilized each configured to deliver a respective component at a desired ratio.

Illustratively, the first pump unit 102 delivers a first liquid component 108 and the second pump unit 104 delivers a second liquid component 110. In one example, the first and second liquid components 108 and 110 are delivered from respective containers (such as 55 gallon drums) using feeder pumps. Material heaters can be utilized for either or both liquid components 108 and 110, for example to control the viscosities of the components and/or create a chemical reaction, such as an isocyanate reaction. The combined liquid components are delivered (e.g., sprayed, extruded, etc.) from the output 106 at a user selected pressure and ratio. For example, the components can be sprayed at pressures up to or exceeding 3200 pounds per square inch (psi) and in ratios of 1:1, 1.25:1, 1.5:1, 1.75:1, 2:1, 5:1, or any other desired ratio. In one example, the maximum pressure is 2000 psi.

Pump unit 102 includes a first brushless DC motor 112 configured to drive a first reciprocating piston pump 114 for delivering the first liquid component 108 to the output 106. Pump unit 104 comprises a second brushless DC motor 118 configured to drive a second reciprocating piston pump 120 to deliver the second liquid component 110 to the output 106. In one embodiment, airless hoses 116 and 122 provide the pressurized first and second liquid components 108 and 110, respectively, to output 106.

The second brushless DC motor 118 and second piston pump 120 illustratively comprise the same types as motor 112 and pump 114. Of course, different types of motors and pumps can be utilized. In one embodiment, motors 112 and 118 comprise 230 volt (V) motors and are configured to run off of a portable generator, such as a gasoline powered generator. Further, while motors 112 and 118 are illustrated as brushless DC motors, other types of motors can be utilized. Further yet, while pumps 114 and 120 are illustrated as reciprocating piston pumps, other types of pumps can be utilized such as rotary pumps, diaphragm pumps, etc.

The first pump unit 102 includes a controller 124 and the second pump unit 104 includes a controller 126. In one embodiment, controllers 124 and 126 can comprise portions of speed controller circuits of motors 112 and 118. In one embodiment, controllers 124 and 126 are separate from motors 112 and 118 and are configured to provide signals to the motors 112 and 118 (i.e., to speed controller circuits of motors 112 and 118) indicative of a desired speed.

Functionality of controllers 124 and 126 can be implemented in hardware, software, and/or firmware. For instance, controllers 124 and 126 can comprise any suitable hardware component(s), such as, but not limited to, microprocessors and the like, for providing input signals to motors 112 and 118 indicative of desired speed settings. In one exemplary embodiment, one or more of controllers 124 and 126 includes storage media storing processor-executable instructions, program modules, data structures, and/or other data, being executed by a microprocessor. Program modules can include routines, programs, objects, components, and/or data structures that perform particular tasks. Generally, storage media includes volatile and/or nonvolatile memory, and can be removable or non-removable. The storage media can include, but is not limited to, optical or magnetic storage device(s), RAM, ROM, EEPROM, flash memory, and/or any other medium that can be used to store the desired information.

In one example, the design of controllers 124 and 126 and brushless DC motors 112 and 118 enable the speeds of pumping units 102 and 104 to be controlled to within three percent of a desired speed setting (i.e., a desired RPM, strokes per minute, etc.). In one particular example, the controllers maintain the pump speeds within two percent (e.g., approximately 1.5 percent) of the desired motor speeds to properly ratio the components. In the illustrated embodiment, controllers 124 and 126 do not require speed feedback from motors 112 and 118.

In the case of piston pumps having reciprocating pistons, assume controller 124 is set to control motor 112 to operate pump 114 at a first number of piston strokes per minute and controller 126 is set to control motor 118 to operate pump 120 at a second number of piston strokes per minute. The first and second numbers can be the same or different, and depend on the selected ratio and pressure settings. In one embodiment, the design of the pump units result in the actual operating speed of piston pump 114 being maintained within two percent of the first number of strokes per minute and the actual operating speed of piston pump 120 being maintained within two percent of the second number of strokes per minute, thereby achieving accurate ratioing of the plurality components.

The first controller 124 is configured to communicate with the second controller 126 using any suitable wired or wireless communication interface. The interface can provide one-way or two-way communication between controllers 124 and 126. In the illustrated embodiment, the first controller 124 is communicatively coupled to the second controller 126 by a wired communication interface 128, such as a cable connecting pump units 102 and 104 together using serial connections, parallel connections, or the like. In another embodiment, the controllers 124 and 126 can communicate wirelessly using suitable wireless communication connections, such as, but not limited to, radio frequency (RF) communication, infrared (IR) communication, and microwave communication. Some particular examples include, but are not limited to, wireless LAN, Wi-Fi, and Bluetooth®.

The first pump unit 102 operates as a master unit that sends a signal to the second pump unit 104, which operates as a slave unit, to run at a proper speed or RPM to correctly ratio the first and second liquid components 108 and 110. In one embodiment, the second pump unit 104 can be configured to response by sending a confirmation signal to the first pump unit 102.

A user desired ratio and/or pressure can be entered using one or more input components 130 of a user interface 132 of pump unit 102. For example, a desired ratio can be selected on a display screen 134. In one embodiment, selectable ratios in step increments of 0.25 are provided (i.e., 1:1, 1.25:1, 1.5:1, 1.75:1, etc.). Further, adjustable ratio increments of less than 0.2 can also be provide for fine tuning the ratio for materials that require tight tolerance ratio control. For example, in one embodiment ratio increments of one-sixty-fourth ($1/64^{th}$ or 0.015625) are utilized to create a tolerance that is adjustable to within two percent. Second pump unit 104 can also include a user interface 136 that includes a display and/or one or more input components 138, for example enabling a user to set a desired pressure of pump unit 104.

The input components can include controls for adjusting a high pressure limit or threshold and a low pressure limit or threshold for pump units 102 and 104. For example, an error message is displayed on display 134 if either pump unit 102 or 104 exceeds a respective high pressure limit and/or low pressure limit defined by the user. The error message indicates which limit ("high" or "low") was exceeded as well as which pump unit 102 or 104 exceeded the limit. In another example, a pressure alarm is activated if a difference in pressures between the pump units 102 and 104 exceeds or falls below a threshold. For instance, the pressure alarm can include activating visual and/or audible indicators if the difference in pressures of the pump units 102 and 104 exceeds 300 psi. Other example of error messages that can be displayed include over-temperature conditions, check motor indications, check transducer indications, etc., in addition to indicating which pump unit has the issue.

Input components 130 can also include a mode control that enables the pump units 102 and 104 to be placed in one of a plurality of different modes. One example is an unlinked mode in which the pump units are operated independently of one another in an unlinked state, for example to prime or clean the respective pumps and hoses. Input components 130 can also include a link pumps control for linking pump units 102 and 104, for example after a pump priming process.

Figure 2:
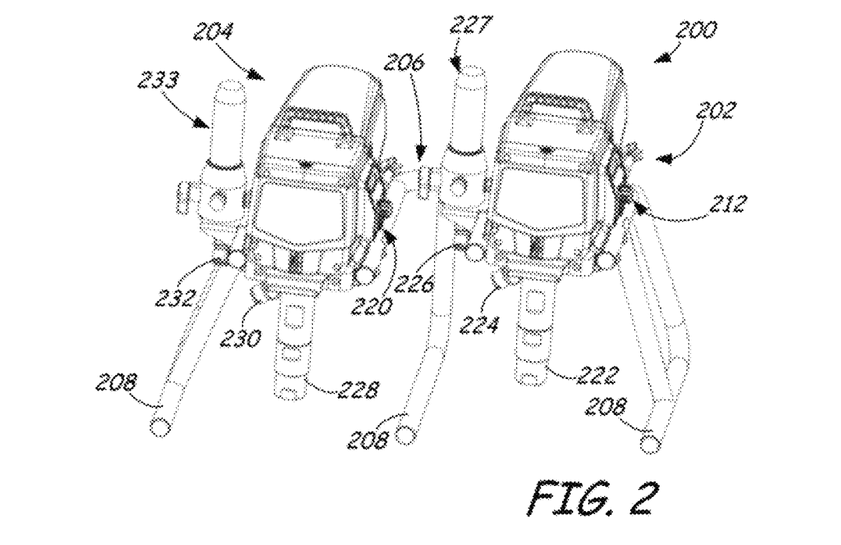
FIG. 2 is a front perspective view of a plural component pump system, under one embodiment.
Figure 3:
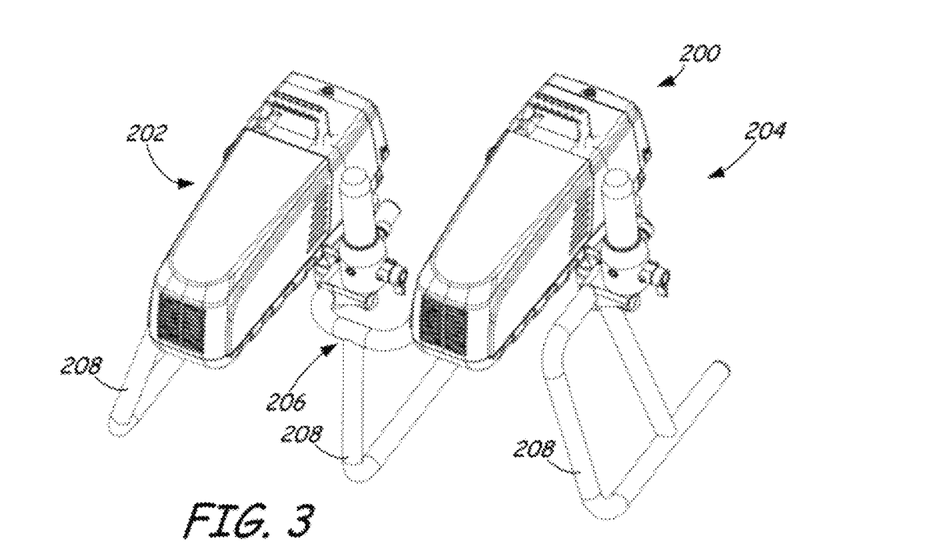
FIG. 3 is a rear perspective view of the plural component pump system illustrated in FIG. 2.
Figure 4:
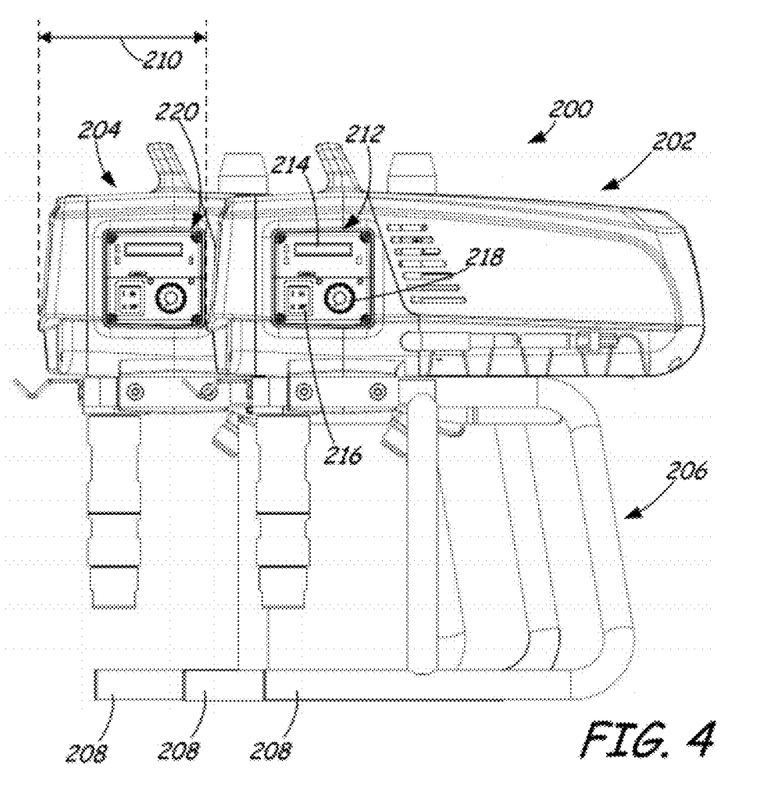
FIG. 4 is a side view of the plural component pump system illustrated in FIG. 2.

FIG. 2 is a perspective view illustrating a plural component pump system 200, under one embodiment. System 200 includes a first pump unit 202 and a second pump unit 204. In one embodiment, pump units 202 and 204 are substantially similar to pump units 102 and 104 illustrated in FIG. 1. FIGS. 3 and 4 are a rear perspective and side views of pump system 200, respectively.

Pump units 202 and 204 are mounted to respective portions of a frame 206. The frame 206 includes legs 208 supporting the pump units 202 and 204 at an elevated position above a support surface. In one embodiment, the frame 206 can include wheels for transporting pump system 200.

In the illustrated embodiment, pump units 202 and 204 are mounted to frame 206 at offset positions. As shown in FIG. 4, in one particular example pump unit 202 is offset from pump unit 204 a distance represented by arrow 210. This offset between the pump units enhances the accessibility of the controls of unit 204.

Pump unit 202 illustratively includes a control panel 212 having one or more input controls and a display component 214, such as, but not limited to, a liquid crystal display (LCD) screen. Control panel 212 can include a power switch 216 and a pressure control knob 218. Alternatively, or in addition, panel 212 can include one or more user actuatable buttons and/or a touch sensitive display screen enabling the user to interact with the pump unit, for example to select desired operational modes and pressure and ratio settings.

Pump unit 204 includes a control panel 220 which, in the illustrated embodiment, is substantially similar to panel 212 and includes one or more input controls and a display component. In other embodiments, control panel 220 can be different than panel 212, such as by including additional control components or having less control components than panel 212.

Pump units 202 and 204 are connected via a communication interface (not shown in FIGS. 2-5), such as communication interface 128 illustrated in FIG. 1. The communication interface enables pump unit 202 to send a signal to pump unit 204 to control the speed of and output from pump unit 204.

Pump unit 202 includes an inlet port 222 providing an inlet fluid path from a fluid container (not shown in FIGS. 2-5) and a return port 224 providing a return fluid path to the fluid container. An output port 226 of pump unit 202 provides pressurized material to a spray gun, for example, via a hose connected to the output port 226. Pump unit 202 can also include a material heater 227 that heats the material pumped by pump unit 202 to a desired temperature prior to exiting port 226. In one example, material heater 227 includes a control mechanism, such as a knob or dial, such that a user can select the desired temperature.

Pump unit 204 includes an inlet port 228 providing an inlet fluid path from a fluid container (not shown in FIGS. 2-5) and a return port 230 providing a return fluid path to the fluid container. An output port 232 of pump unit 204 provides pressurized material to a spray gun, for example, via a hose connected to the output port 232. Pump unit 204 can also include a material heater 233 that heats the material pumped by pump unit 204 to a desired temperature prior to exiting port 232. In one example, material heater 233 includes a control mechanism, such as a knob or dial, such that a user can select the desired temperature.

Figure 5:
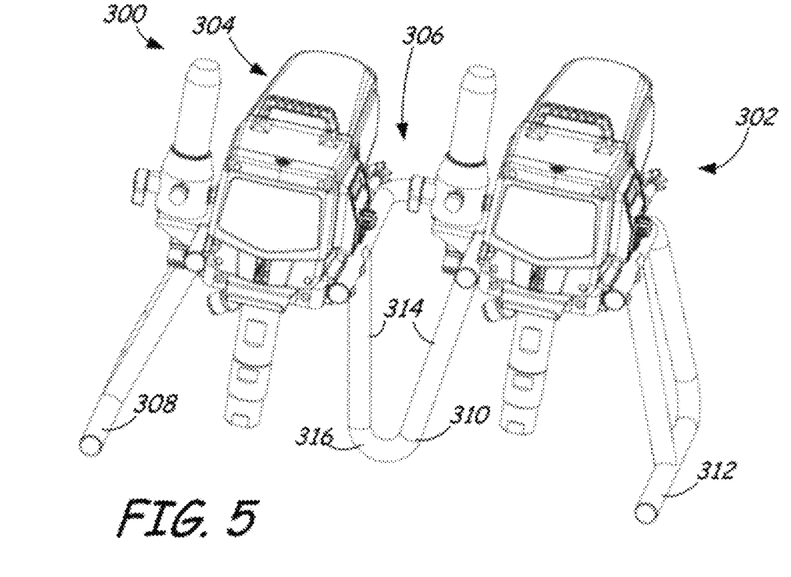
FIG. 5 is a perspective view of a plural component pump system, under one embodiment.
Figure 6:
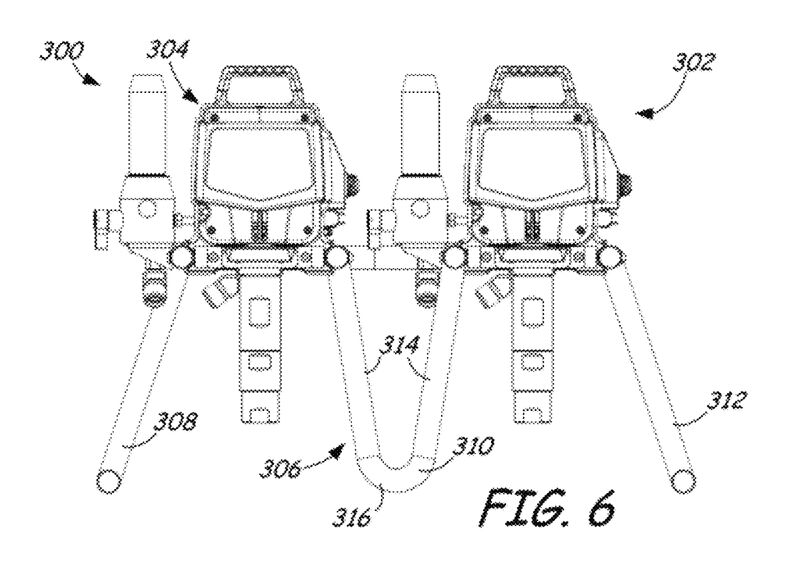
FIG. 6 is a front view of the plural component pump system illustrated in FIG. 5.

FIGS. 5 and 6 are perspective and front views, respectively, of a plural component pump system 300, respectively. Pump system 300 includes a first pump unit 302 and a second pump unit 304. In one embodiment, pump units 302 and 304 are substantially similar to pump units 202 and 204 illustrated in FIG. 2. Pump units 302 and 304 are mounted to respective portions of a frame 306 and can be offset from one another. Frame 306 includes a plurality of legs 308, 310, and 312. Leg 310 includes straight portions 314 extending from the pump units 302 and 304 and a curved portion 316 connecting the straight portions 314.

Figure 7:
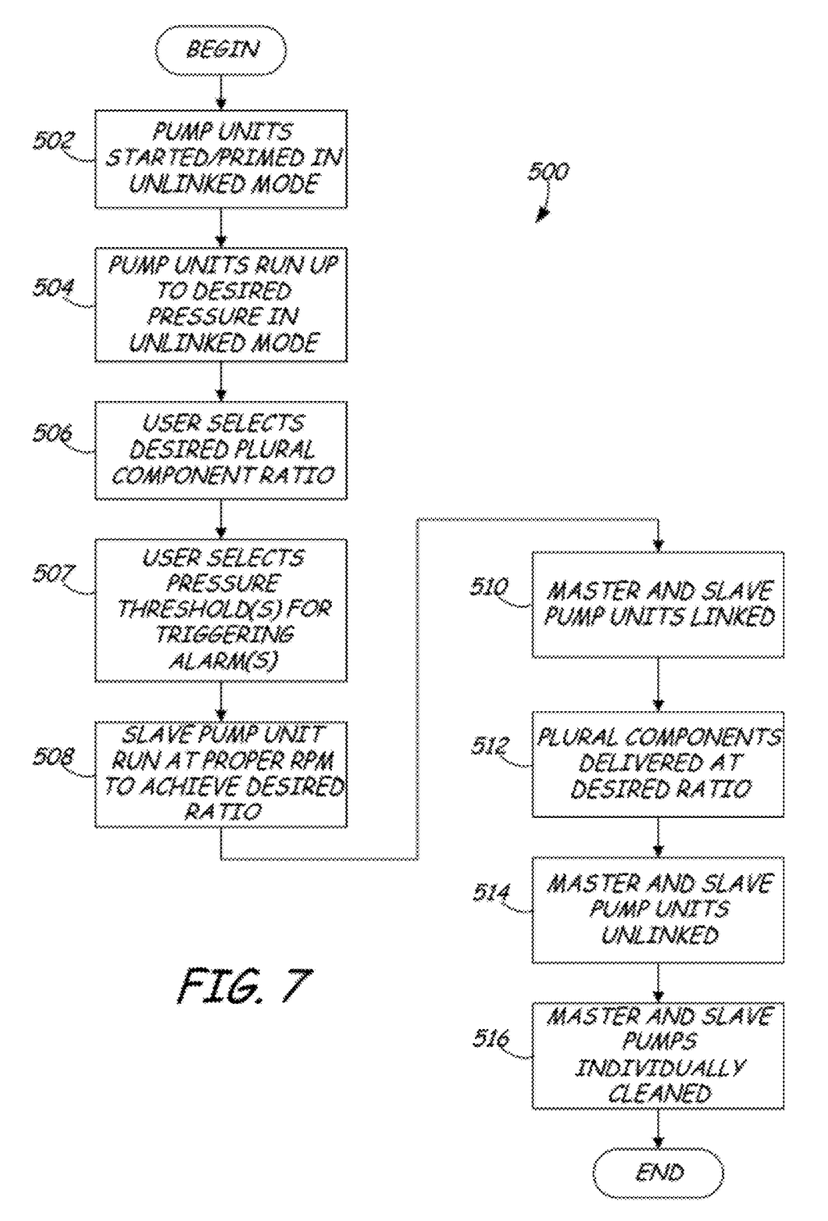
FIG. 7 illustrates a method for operating a plural component pump system, under one embodiment.

FIG. 7 illustrates a method 500 for operating a plural component pump system, under one embodiment. For purpose of illustration, and not by limitation, method 500 will be discussed in the context of pump system 100.

At block 502, the first or master pump unit 102 and second or slave pump unit 104 are started in a first, unlinked mode such that each pump unit 102 and 104 runs independently, in an unlinked state, to prime the respective piston pumps 114 and 120 and hoses 116 and 122.

At step 504, once the pumps and hoses are primed, the pump units 102 and 104 are ran up to the desired pressure selected by the user. In one embodiment, the desired pressure setting can be selected by the user through interface 132 before, after, or during priming of the pump units 102 and 104 at step 502.

At step 506, the user selects the desired ratio of the first and second liquid components 108 and 110. Again, this ratio can be selected by the user through interface 132 before, after, or during priming of the pump units 102 and 104 at step 502, for example.

At step 507, the user selects pressure alarm and/or threshold settings for pump operation. These settings can be selected by the user through interface 132 before, after, or during priming of the pump units 102 and 104 at step 502, for example. In one embodiment, the pressure threshold is indicative of an allowed or acceptable pressure difference or imbalance between the pump units 102 and 104. For instance, an alarm can be activated if a pressure difference between the pump units exceeds 300 psi. In another example, a pressure threshold can indicate a high pressure limit and/or a low pressure limit in one or more of the pump units.

In one embodiment, at step 507 an alarm menu is presented to the user with variable alarm settings. For instance, the alarm menu can enable the user to selected desired pressure thresholds as well as one or more alarm activation modes. For instance, a first user selectable alarm "ON" mode can configure the controllers to turn off their respective pumps when a pressure alarm is activated. A second user selectable alarm "OFF" mode configures one or more of the controllers to activate audible and/or visual indicators when a pressure threshold is reached, but allow continued operation of the pump units.

At step 508, the second pump unit 104 is run at the proper speed to achieve the desired ratio selected by the user at block 506.

At block 510, the first and second pump units 102 and 104 are placed in a second, linked mode wherein the first pump unit 102 controls the speed of the second pump unit 104 to maintain the desired ratio selected by the user. The pressure control function of the second pump unit 104 (if one is provided) is disabled. The first and second pump units 102 and 104 can be linked at block 510 automatically, for example in response to a determination that proper motor speeds and/or pressures have been reached, or in response to user selection of a link pump control through user interface 132. The plural components are delivered (e.g., sprayed, extruded, etc.) at the desired ratio at block 512.

By way of example, if the user selects a 1:1 ratio and the first pump unit 102 is set at 1500 psi, the system, once "linked", will run both pump units 102 and 104 at the same RPM disregarding any pressure differences between pump units 102 and 104, unless a pressure of either pump units exceeds a pressure threshold.

In another example, if a user selects a 1.5:1 ratio and the first pump unit is set at 1500 psi, the system, once "linked", will run the second pump unit 104 at a determined ratio, such as two-thirds the speed of the first pump unit or approximately 1000 psi. The ratio can be calculated by the controller and/or can be pre-determined and stored in a lookup table of the controller. When the user starts to spray the plural component mixture, pump unit 102 will run at 1.5 times the speed of pump unit 104 disregarding slight pressure differences between the pump units, unless a pressure of one or both of the pumps exceeds a pressure threshold.

In one embodiment, when the pump units 102 and 104 are "linked", the user can adjust the pressure of pump unit 102 only. Changing the pressure of pump unit 102 will automatically change the speed of pump unit 104 to maintain the desired ratio of components 108 and 110.

For clean-up of the pump system 100, the pump units 102 and 104 can be placed in the unlinked mode at block 514, for example by the user selecting an unlink control through interface 132. At block 516, the pump units 102 and 104 are individually flushed and cleaned by operating the controls of each pump unit independent of the other pump unit. The pump units can be left wet after cleaning.

Figure 8:
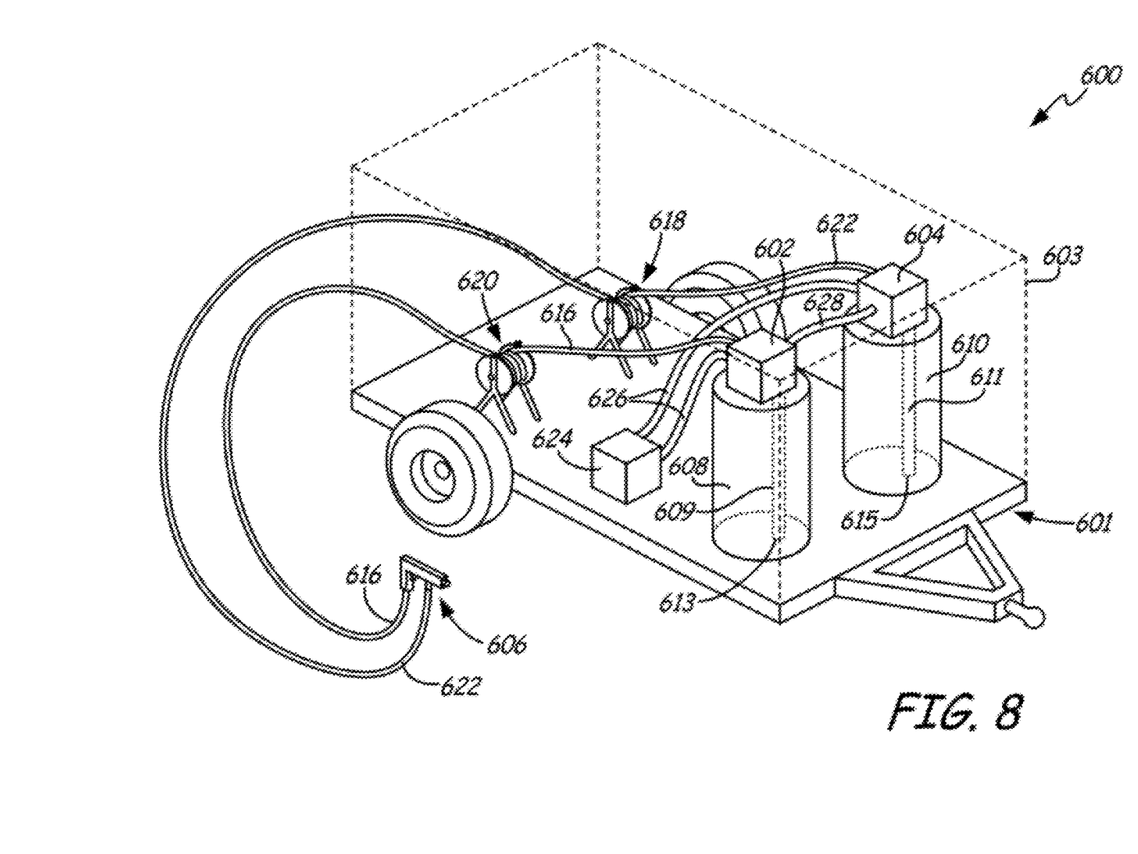
FIG. 8 illustrates a plural component pump system, under one embodiment.

FIG. 8 illustrates one embodiment of a plural component pump system 600 for delivering plural liquid components. Pump system 600 is illustratively provided as a mobile unit that can be transported to a job site. The mobile unit includes a mobile apparatus 601, such as a conventional vehicle trailer, including an enclosure which is represented by dashed lines 603.

Pump system 600 includes a first pump unit schematically represented by block 602 and a second pump unit schematically represented by block 604. In one embodiment, pump units 602 and 604 are similar to pump units 102 and 104 illustrated in FIG. 1. Pump unit 602 is configured to pump a first liquid component from a first container 608 and pump unit 604 is configured to pump a second liquid component from a second container 610. Containers 608 and 610 are, in one embodiment, large containers provided within mobile apparatus 601. For instance, in one example containers 608 and 610 hold more than 5 gallons of liquid component. In one particular example, container 608 and 610 are conventional 55 gallon barrels.

Pump units 602 and 604 include inlet tubes positioned within their respective liquid components. A first inlet tube 609 of pump unit 602 is disposed at least partially within container 608 and is configured to siphon the liquid component contained therein. A second inlet tube 611 of pump unit 604 is disposed at least partially within container 610 and is configured to siphon the liquid component contained therein. Tubes 609 and 611 have intake ends 613 and 615 positioned proximate the bottom of the respective container.

In one embodiment, separate transfer or feeder pumps can be used to pump the liquid components to pump units 602 and 604. In the illustrated embodiment, pump units 602 and 604 are configured to pump the liquid components directly from containers 608 and 610. For example, pump units 602 and 604 can be mounted directly on or in close proximity to the respective containers 608 and 610. In this manner, the embodiment illustrated in FIG. 8 does not require the use of separate transfer or feeder pumps, which can reduce the cost and/or complexity of the pump system.

Pump unit 602 includes an outlet providing pressurized liquid component via a tube 616 to an output component 606, such as a spray gun or extrusion gun. Pump unit 604 includes an outlet providing pressurized liquid component via a tube 622 to the output component 606. In the illustrated embodiment, output component 606 comprises a plural component spray gun having an internal mixing chamber configured to mix the pressurized first and second liquid components supplied from tube 616 and 622. In one embodiment, the spray gun can be configured to mix the plural components externally. In one embodiment, the plural components can be mixed using a separate mixing chamber.

Pump system 600 can also include material heaters 618 and 620 that heat the liquid components to control the viscosities of the components. One example of a material heater includes the TempSpray™ products by J. Wagner GmbH of Markdorf, Germany. Another example includes in-line heaters manufactured by Watlow Electric Manufacturing.

Pump system 600 includes a portable electric generator 624 providing power to pump units 602 and 604 via power cords 626 and/or providing power to heaters 618 and 620. In one embodiment, pump units 602 and 604 operate on 230 Volts supplied from generator 624.

Pump system 600 also includes a communication interface allowing one-way or two-way communication between pump units 602. The communication interface illustratively including a cable 628 connecting the pump units 602 and 604, for example using a serial interface. In one embodiment, the pump units 602 and 604 can be configured to communicate wirelessly.

Pump unit 602 is configured to communicate a signal to pump unit 604 that is used to control the speed and output of pump unit 604 to maintain a desired ratio of the plural liquid components being sprayed from spray gun 606.

Although the subject matter presented herein have been described with reference to particular embodiments, workers skilled in the art will recognize that changes may be made in form and detail without departing from the spirit and scope of the subject matter described herein.

What is claimed is:

1. A plural component pump system for delivering plural liquid components at a selected ratio, the pump system comprising:
   a first brushless DC motor configured to drive a first pump that pumps a first liquid component to an output;
   a second brushless DC motor configured to drive a second pump that pumps a second liquid component to the output;
   wherein one or more of the first and second pumps comprise a reciprocating piston pump;
   a first controller configured to control the first brushless DC motor;
   a second controller configured to control the second brushless DC motor; and
   a communication interface between the first controller and the second controller, wherein:
   the first controller is configured to send a first signal to the second controller using the communication interface, the first signal being indicative of a motor characteristic corresponding to the second brushless DC motor; and the second controller has a plurality of control modes for the second brushless DC motor, including at least:
a linked mode wherein the second controller is configured to control the second brushless DC motor based on the first signal received from the first controller, and wherein the first controller, upon detecting a change in a motor characteristic of the first brushless DC motor, is further configured to automatically send a second signal indicative of a change in the motor characteristic corresponding to the second brushless DC motor, directly to the second controller such that the ratio between a first magnitude of the first liquid component and a second magnitude of the second liquid component is maintained, and, while in the linked mode, a pressure control function of the second pump is disabled, such that the ratio between the first magnitude of the first liquid component and the second magnitude of the second liquid component is governed by a characteristic other than a pressure of the second pump; and
an unlinked mode, wherein the second brushless DC motor is operated by the second controller independent of the first signal; and
wherein the communication interface further comprises an input component configured to receive an input from a user, wherein the received input specifies switching a controller mode for the second controller from a first control mode to a second control mode, wherein the first control mode is different from the second control mode, and wherein each of the first and second control modes are selected from either the linked mode or the unlinked mode.

2. The plural component pump system of claim 1, wherein the first signal is related to an actual operating speed of the first motor.

3. The plural component pump system of claim 1, wherein the first and second controllers are configured to control the first and second brushless DC motors to drive the first and second pumps for priming and cleaning the first and second pumps.

4. The plural component pump system of claim 1, wherein the selected ratio is user-selectable using the input component.

5. The plural component pump system of claim 4, wherein first and second speed settings are selected for the first and second pumps, respectively, as a function of the user selected ratio.

6. The plural component pump system of claim 4, wherein the selected ratio is selectable using the input component in step increments of less than or equal to 0.25.

7. The plural component pump system of claim 4, and further comprising at least one user configurable pressure alarm setting.

8. The plural component pump system of claim 7, wherein the at least one pressure alarm setting is configurable by the user using the input component and comprises a user selectable pressure threshold.

9. The plural component pump system of claim 8, wherein a pressure alarm is configured to be activated based on a pressure threshold setting defined by the user.

10. A plural component pump system for delivering a plurality of liquid components at a selected ratio, the plural component pump system comprising:
a first brushless DC motor configured to drive a first pump configured to pump a first liquid component to an output;
a second brushless DC motor configured to drive a second pump configured to pump a second liquid component to the output;
a first controller configured to control the first brushless DC motor;
a second controller configured to control the second brushless DC motor;
an input component configured to receive an input from a user, wherein the received input specifies an alarm threshold, wherein the alarm threshold is a difference in pressure between the first pump and the second pump; and
an indicator component configured to provide an indication when the alarm threshold is exceeded; and
a communication interface between the first controller and the second controller, wherein:
the first controller is configured to send a first signal to the second controller using the communication interface, the first signal being indicative of a motor characteristic, corresponding to the second brushless DC motor; and
the second controller has a plurality of control modes for the second brushless DC motor, including at least:
a linked mode wherein the second controller is configured to control the second brushless DC motor based on the first signal received from the first controller, and wherein the first controller, upon detecting a change in a motor characteristic of the lust brushless DC motor, is further configured to automatically send a second signal indicative of a change in the motor characteristic corresponding to the second brushless DC motor, directly to the second controller such that the ratio between a first magnitude of the first liquid component and a second magnitude of the second liquid component is maintained, and, while in the linked mode, a pressure control function of the second pump is disabled, such that the ratio between the first magnitude of the first liquid component and the second magnitude of the second liquid component is governed by a characteristic other than a pressure of the second pump; and
an unlinked mode wherein the second brushless DC motor is operated by the second controller independent of the first signal.

11. The system of claim 10, wherein the indication is a visual indication.

12. A method of operating first and second pump units to deliver plural components at a particular ratio, the method comprising:
operating the first and second pump units in a first mode of operation, wherein the first mode comprises operating the first pump unit independently from the second pump unit, such that each of the first and second pump units operate independent of the particular ratio between a first magnitude of a first liquid from the first pump unit and a second magnitude of a second liquid from the second pump unit, and wherein the first pump unit is controlled by a first pump controller and the second pump unit is controlled by a second pump controller;
receiving an input on an input component, wherein the input specifies a second mode of operation;

switching an operating mode of the first and second pump units, based on the received input, from the first mode to the second mode, wherein the second mode comprises operation of the second pump unit based on the first pump unit such that the second pump controller is controlled by the first pump controller such that the particular ratio is maintained, and, wherein, a pressure control function of the second pump unit is disabled in response to operating the first and second pump units in the second mode;

sending a first signal from the first pump controller to the second pump controller based on the particular ratio in response to operating the first and second pump units in the second mode; and sending a second signal from the first pump controller to the second pump controller based on a detected change in an operating characteristic of the first pump unit, the second signal being indicative of a change to an operating characteristic of the second pump unit; and wherein each of the first and second pump units comprises a brushless DC motor configured to drive a fluid pump.

13. The method of claim 12, wherein operating the first and second pump units in the first mode comprises at least one of:

priming the first and second pump units; and cleaning the first and second pump units.

14. The method of claim 12, wherein operating the first and second pump units in the second mode comprises:

receiving a user input indicative of a pressure setting; and sending the first signal from the first pump unit to the second pump unit based on the particular ratio and the pressure setting.

* * * * *